United States Patent [19]
Burgess et al.

[11] Patent Number: 5,355,845
[45] Date of Patent: Oct. 18, 1994

[54] TEMPERATURE MEASUREMENT IN POWER GENERATOR BOILERS

[75] Inventors: James J. Burgess, Morris Plains; Richard T. LaGrotta, West Orange; Frank A. Magnotti, Millburn; Walter V. Werner, Sparta, all of N.J.

[73] Assignee: AT&T Bell Laboratories, Murray Hill, N.J.

[21] Appl. No.: 131,348

[22] Filed: Oct. 4, 1993

[51] Int. Cl.⁵ .......................................... F22B 37/42
[52] U.S. Cl. .................... 122/504; 122/6 A; 374/121; 374/127
[58] Field of Search ............... 122/504, 6 A; 165/904; 374/121, 127; 431/79, 80; 110/190, 185

[56] References Cited

U.S. PATENT DOCUMENTS

| | | | |
|---|---|---|---|
| 4,539,588 | 9/1985 | Ariessohn et al. | 374/127 X |
| 4,615,302 | 10/1986 | Wynnyckyj et al. | 122/379 |
| 5,196,830 | 3/1993 | Birging et al. | 374/121 X |

*Primary Examiner*—Edward G. Favors
*Attorney, Agent, or Firm*—Charles E. Graves

[57] ABSTRACT

Temperatures along the surfaces of water tubes in an operating steam boiler are determined by detecting infrared radiation emitted from the tube surfaces in one or more narrow pass-bands founds to be available despite the presence of hot and turbulent flue gases between the sensor and the tube surface to be measured.

7 Claims, 4 Drawing Sheets

TEMPERATURE MEASUREMENT IN POWER GENERATOR BOILERS

FIELD OF THE INVENTION

This invention relates to measurement of surface temperatures and particularly of exterior surfaces of boiler tubes in operation in power generator boilers.

BACKGROUND OF THE INVENTION

Radiative boilers typically are constructed with pressurized water tubes surrounding a vertically contained heat source. The heat is furnished and controlled by introducing and burning oil or natural gas at many selected points in the vertical structure. Coal-fired boilers operate similarly. The radiation impinges on the water tubes, and the water is heated and transformed first to steam and then to superheated steam which is passed through turbines to generate electrical power.

A major cause of power outages is failure of the pressurized water tubes. A common cause of such failures is stress rupture caused by short-term overheating, high-temperature creep, dissimilar metal welds and/or abrupt or uneven changes of boiler tube temperatures at elevated temperature ranges.

Water tube failures require the unscheduled shutdown of the boiler, sometimes for extended periods. Being able to anticipate water tube time of failure would enable unscheduled shutdowns to be avoided, and enable instead an optimally planned overhaul for the watertubes at the end of their useful lives but before failure.

Unfortunately, the ability to predict tube life in terms, for example, of mean time to failure has been almost wholly lacking in power plant maintenance because of the complex failure mechanisms at work. The one most reliable predictor is considered to be water tube surface temperatures determined over time. Yet, current mechanisms for making accurate water tube surface temperature measures during operation are either prohibitively expensive or short-lived themselves because of the extreme temperatures and corrosive character of the combustion products.

SUMMARY OF THE INVENTION

It has been determined that there are narrow but usable pass-bands in the radiation/absorption spectra in the infrared region for the combustion gasses typically present in power generating boilers, which enable infrared emissions from heated surfaces of the boiler tubes to travel through the gasses for substantial distances without contamination or attenuation. In accordance with the invention, the temperature of water tube surfaces in a power generator boiler is detected by detecting infrared radiation emitted from selected regions along the inwardly-facing sides of the water tubes using tuned infrared detectors disposed on the opposite side of the furnace.

The detectors are tuned to one or both of two infrared passbands discovered to be available. The detectors may be one of a number of different devices, including an infrared camera, or commercially available infrared sensors. Since either of these require elaborate cooling apparatus to function within the furnace, a preferred detector in accordance with the invention is high-temperature tolerant optical fiber.

DETAILED DESCRIPTION OF AN ILLUSTRATIVE EMBODIMENT

Figure 1:
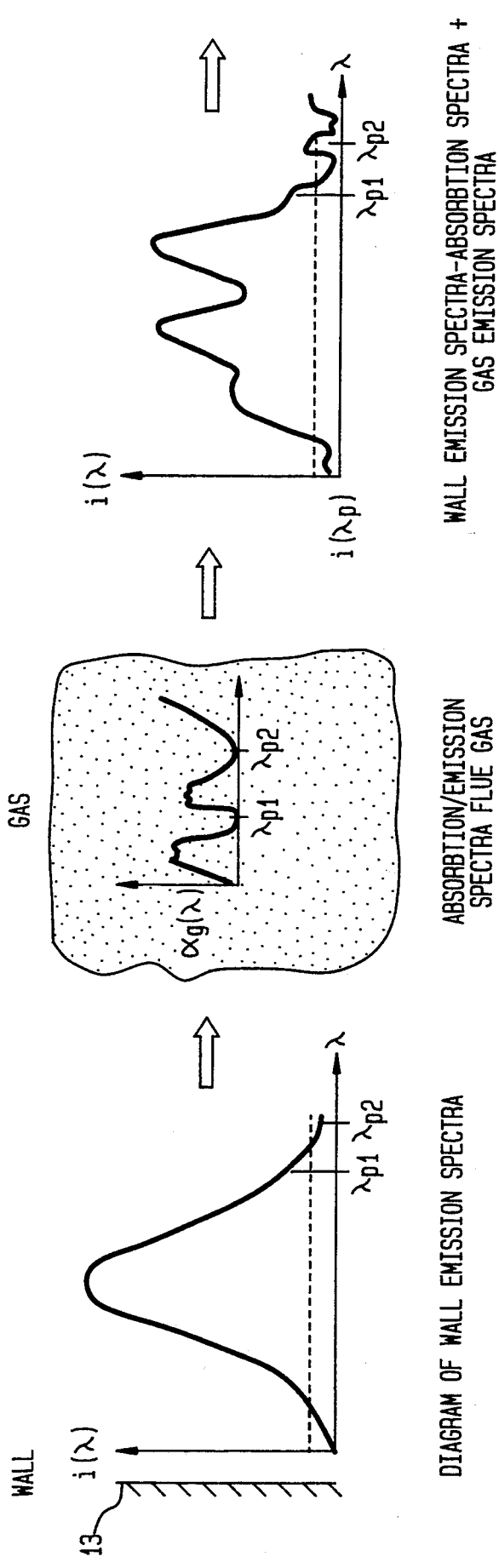
FIGS. 1 and 2 are charts showing concept of operation.
Figure 2:
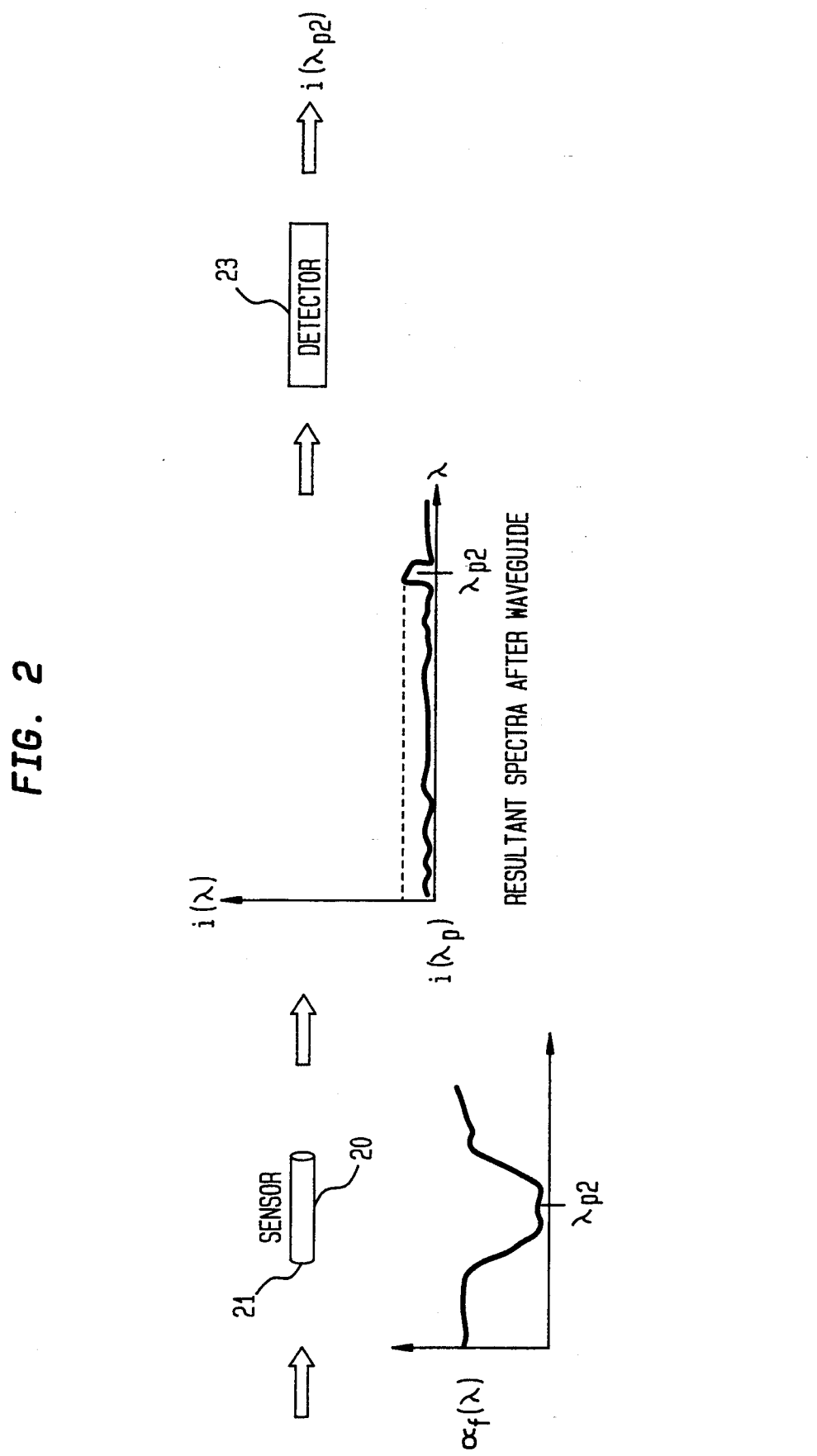
Figure 3:
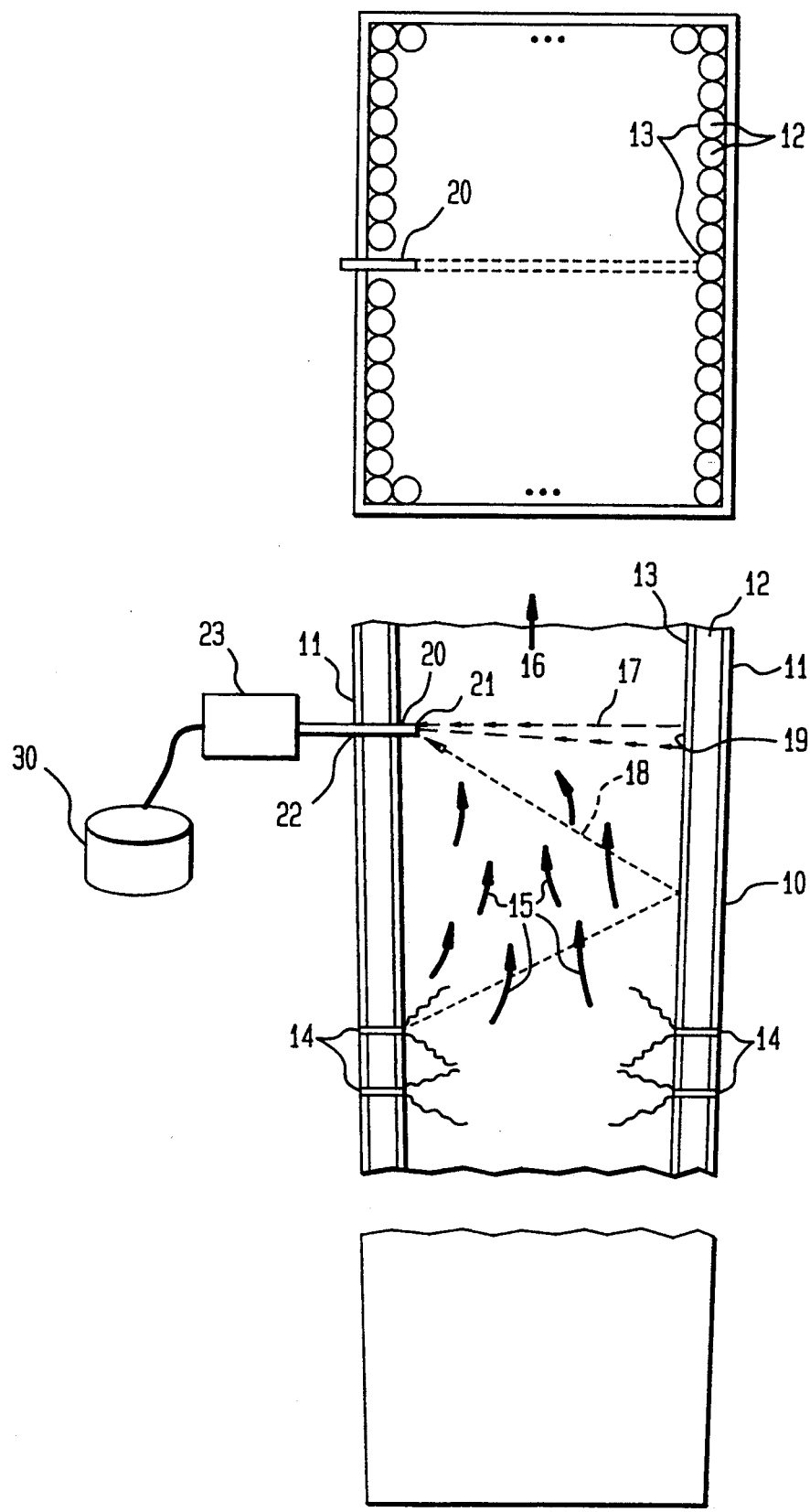
FIG. 3 is a schematic diagram of a steam-generating boiler.

The general principle of operation for remote infrared measurements is shown in the charts of FIGS. 1 and 2; and the schematic boiler drawing of FIG. 3. In the example, the boiler is fired with natural gas. Radiation energy is emitted from a boiler wall 11 of boiler 10. Boiler wall 11 typically is formed as a series of vertical tubes denoted schematically as tubes 12. Each tube 12 has a surface 13 that faces inwardly onto the boiler interior and the combustion products 15 produced by heat sources 14 which are gas jets for gas-fired applications.

A sensor such as optical fiber 20 is placed through an available port 22 in the left wall of boiler 10, its end 21 cleaved to form a planar end surface. Fiber 20 may be mounted to scan on selected vertical areas of any of the tubes 12 at which the fiber end 21 may be scannably pointed. Although only one fiber 20 is shown, several or many may be used at one or more stations through the boiler walls to afford full coverage.

The energy has a wavelength spectra that is closely described by Plank's equation for grey body radiation set out, for example, in "Thermal Radiation Heat Transfer" by Siegel and Howell, Hemisphere Publishing Corporation, 1992. The direct radiation from a selected vertical area of one of the tubes 12 passes through the furnace combustion gas 15. The radiation spectra that arrives at the sensor fiber 20 is reduced in area and reshaped. Peaks and valleys in the spectral distribution correspond to wavelength bands of emission and absorption by the gas as depicted in FIG. 1. While most of the wavelengths are obviously unusable, it has been discovered that wavelength bands exist in the boiler environment where the radiation spectra is not modified. These are hereinafter referred to as "pass-bands." Two pass-bands are shown in the FIGS. 1 and 2 diagrams, labeled $\lambda_1$ and $\lambda_2$ for the gas-fired boiler example.

The sensor such as fiber 20 is constructed advantageously to have an absorption spectra with corresponding pass-bands, as shown in FIG. 2. The wavelength of minimum absorption is a function of the chemical composition of the sensor and of its geometry. Workers in the art will recognize that different lightguide fibers have various discrete regions of low absorption. Advantageously, therefore, pass-bands of the fiber 20 are selected to match the pass-bands of the combustion gas. The fiber 20 may be any optical fiber which is tolerant of the 500° F. to 3000° F. temperatures in the furnace.

One end 21 of the fiber is inserted through the boiler wall 11. The radiation 17 impinging on the fiber end 21 passes down the fiber to radiation detector 23 which measures radiation intensity. The radiation arriving at detector 23 has a spectra that is a small segment of the spectra that was emitted by the furnace wall. Given a knowledge of the pass-band of the combustion gas, the sensor pass-band is built to the same wavelength. In that case, the radiation intensity measured by the detector 23 is proportional to the temperature of the wall.

The advantage of a remote fiber-optic probe over an array of thermocouples or an infrared camera sensor is that the fiber can withstand high temperatures (for example, up to 3500° F. for sapphire fiber), without special cooling systems, and with appropriate scanning mechanisms (not shown) also can provide measurements over an extended area.

Lightguide fibers typically reject radiation outside a small acceptance cone measured normal to the plane of the tip. Therefore, the detected radiation is a measure of the temperature of a relatively small and discrete segment of water tube. For example, hollow core sapphire fibers have an acceptance angle of 3 degrees and will detect radiation from a 19 inch diameter circle if the fiber tip is placed 30 feet from the monitored surface.

Measurements will be most reliable if taken in regions of the boiler that are not exposed to direct flame radiation. FIG. 3 illustrates the placement of fiber 20 in a region well removed from gas jets 14. The radiation at the detector then is not contaminated with direct radiation from the furnace flame; and the reflected indirect radiation 18 from the flames is not intense enough to affect the measurements.

It is advantageous to know the emissivity of the radiating boiler tube surface, because the intensity of radiation from a surface and the degree to which it is contaminated with reflected radiation is proportional to the surface emissivity. Knowledge of emissivity will enable absolute temperature measurements to be made. Without knowledge of emissivity, only relative measurements are possible.

Figure 4:
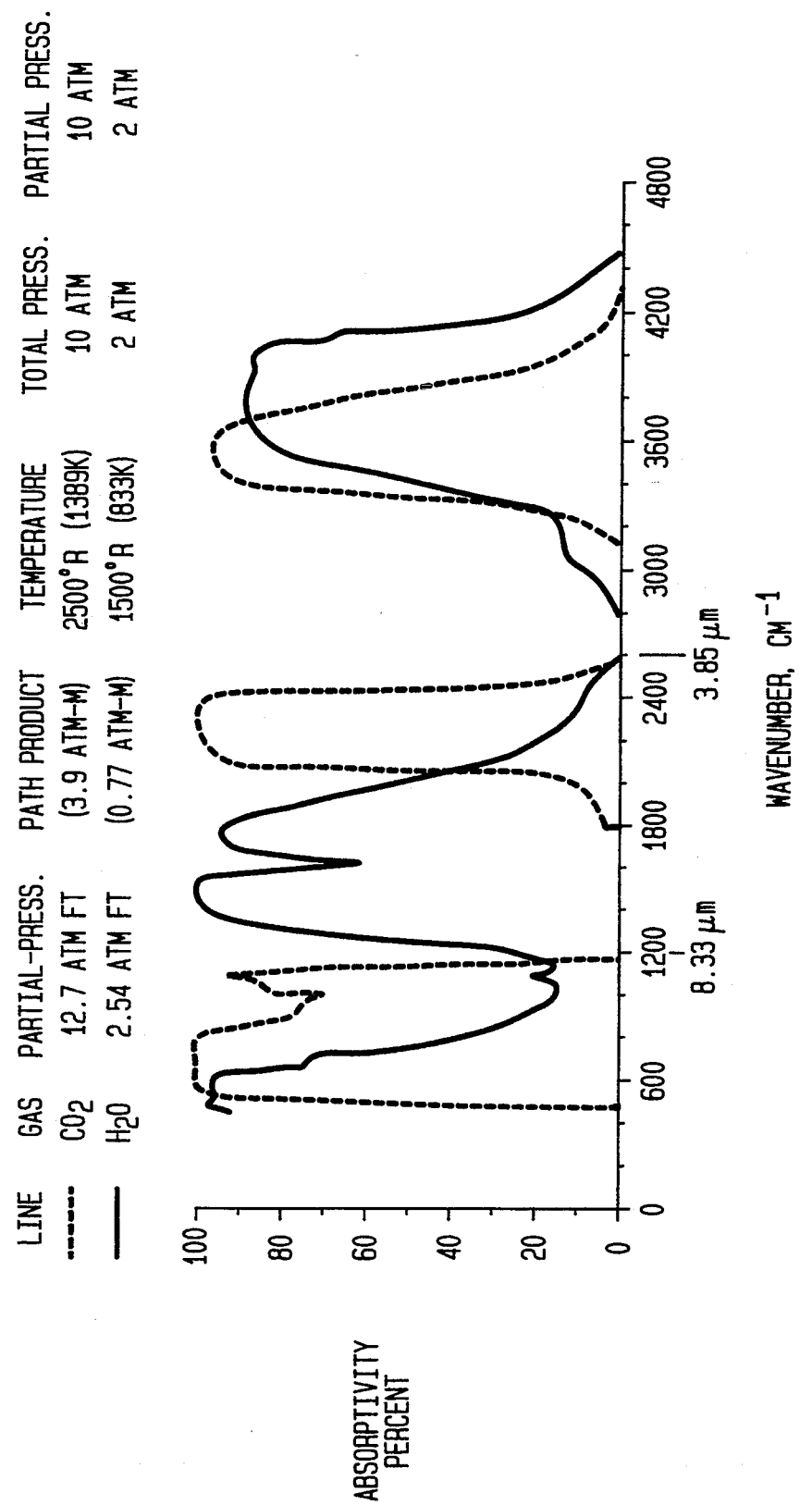
FIG. 4 is a graph of particular gas absorption characteristics.

FIG. 4 shows an example of absorption spectra measured for the primary constituents of typical flue gas from a gas-fired boiler, which are water vapor and carbon-dioxide. The figure is plotted as a function of wavenumber, but two wavelengths are called out, specifically 3.85 $\mu$ and 8.35 $\mu$. The data in the figure demonstrates for the instant example that two wavelength bands exist that pass radiation in an atmosphere of heated and turbulent water and carbon dioxide, one near 3.85 $\mu$ and the other near 8.33 $\mu$.

Analytic work on the absorptance of water vapor suggest that at furnace operating temperatures of 1000° F., the water vapor will have a total absorption coefficient of order $10^{-2}$ for wavelengths greater than 10 $\mu$. This calculation is important because it indicates that infrared measurements can most advantageously be made in the wavelength band near 3.85 $\mu$.

As earlier noted, infrared temperature measurements are based on calculations of Planks' equation for black body radiation. The radiation energy for each wavelength and temperature is assumed to be equal to the emissivity of the radiating body times Planks' equation. In general, the emissivity of the body is a function of both the direction of the transmission path from the body and the wavelength. The accuracy of the measurements will he directly proportional to the accuracy with which the emissivity of the body is known. If the emissivity is constant, then the measurements are simplified.

One method of obtaining temperature measurements at detector 23 is to integrate the energy detected over the bandwidth of the sensor 20; divide the result by the emissivity of the tube surface; and solve Planks' grey body equation for the temperature. Another method is to take the ratio of energies at two distinct wavelengths. This ratio will be equal to the energy ratio at the same wavelengths in the black body spectra at the same temperature as the surface. A disadvantage of the second approach is that it requires a detector capable of very fine wavelength resolution. A disadvantage of the first approach is that an accurate value of the emissivity must be known to obtain accurate temperature measurements. Either method, however, provides temperature measurement of the water tubes 12 which taken over time and stored in a data base 30 and subject to routine analysis, can yield accurate estimates of how rapidly the tubes at vinous locations in the boiler are failing.

We claim:

1. For a steam-generating boiler comprising water tubes disposed along the internal wall of said boiler and a heat source creating high-temperature gaseous combustion products passing within said boiler and heating said tubes, apparatus for measuring the temperature at selected surface segments of said water tubes, comprising:

means for remotely sensing infrared radiation emitted from a said surface segment at one or more wavelengths corresponding to pass-bands in the infrared radiation/absorption spectra of said combustion products;

means for measuring the intensity of said Sensed infrared radiation; and means for converting said measure radiation intensity to an indicia of the temperature of said surface segment.

2. Apparatus in accordance with claim 1, Wherein said sensing means further comprises means for receiving infrared radiation predominantly directly from said surface segment.

3. Apparatus in accordance with claim 2, further comprising means for mounting said sensing means a substantial distance from said heat source thereby to prevent the reception of direct radiation from said heat source by said sensor.

4. Apparatus in accordance with claim 3, wherein said sensing means is an optical fiber having an absorption spectra with at least one pass-band tuned to a corresponding pass-band wavelength of said combustion products.

5. Apparatus in accordance with claim 4, further comprising:

means for determining a time period when the emissivity of said surface segments is substantially constant; and means for developing said indicia of temperature during said period.

6. Apparatus in accordance with claim 5, wherein said combustion products comprise substantially water and carbon dioxide; and wherein said pass-bands are at wavelengths of substantially 3.85 and 8.33 micrometers.

7. Apparatus in accordance with claims 1,, 2, 3, 4, 5, or 6, further comprising:

means for scanning said optical fiber to sequentially focus on plural selected water tube surface segments; and means for storing data on said temperature measurements taken over time on said segments.

* * * * *